United States Patent [19]

Marks

[11] Patent Number: 4,782,427

[45] Date of Patent: Nov. 1, 1988

[54] BUILDING ENTRANCE TERMINAL

[75] Inventor: Robert J. Marks, Carpentersville, Ill.

[73] Assignee: Northern Telecom Limited, Montreal, Canada

[21] Appl. No.: 56,776

[22] Filed: Jun. 2, 1987

[51] Int. Cl.[4] .................................................. H01R 9/24
[52] U.S. Cl. ....................................... 361/426; 361/356; 361/428; 379/397
[58] Field of Search ........................ 174/53, 57–58; 361/334, 357–360, 372–373, 426, 428; 379/326–327, 329, 331, 397, 398; 439/135, 571, 709

[56] References Cited

U.S. PATENT DOCUMENTS

| | | | |
|---|---|---|---|
| 3,493,819 | 2/1970 | Shattuck et al. | 361/334 |
| 4,516,818 | 5/1985 | Johnston et al. | 379/397 |
| 4,605,275 | 8/1986 | Pavel | 379/329 |

Primary Examiner—Roy N. Envall, Jr.
Assistant Examiner—Gregory D. Thompson
Attorney, Agent, or Firm—Foley & Lardner, Schwartz, Jeffery, Schwaab, Mack, Blumenthal & Evans

[57] ABSTRACT

Building entrance terminal having a storage space for incoming cable lying at the side of a terminal block in the incoming field, as distinct from the terminal block and storage space being located one behind the other.

6 Claims, 3 Drawing Sheets

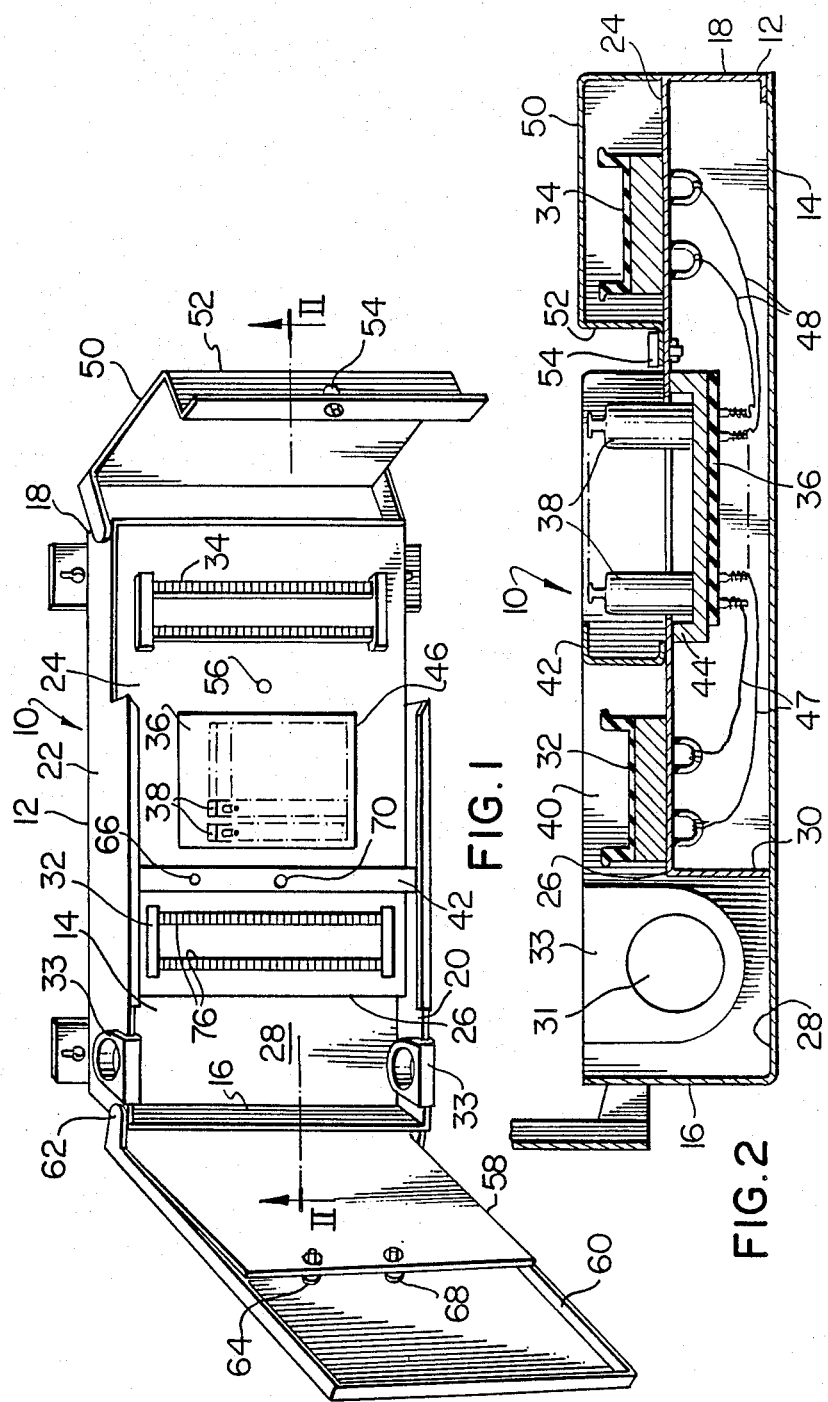

BUILDING ENTRANCE TERMINAL

BACKGROUND OF THE INVENTION

1. Field of the Invention

This invention relates to building entrance terminals.

2. Description of Related Art

In known building entrance terminals, there is a housing which carries a terminal block in an incoming field, a mounting block for overvoltage protection units in a protection field and another terminal block in an outgoing field. Conductor wiring extends from the terminal block of the incoming field to terminals of the mounting block and then from other terminals of the mounting block to terminals of the terminal block in the outgoing field. This wiring is factory installed and lies in a region called "the back plane" of the housing which is inaccessible to the customer. Detachable overvoltage protection units mounted upon the mounting block connect the incoming and outgoing fields and serve as a protection to the outgoing field and to a customers's circuit from overvoltage surges on an incoming cable. The incoming cable extends into the housing and has conductor wires connected to the terminal block in the incoming field.

The need to locate the incoming cable close to the terminal block of the incoming field so as to enable the incoming cable to be connected into the incoming terminals, causes difficulties in known constructions during the connection process. To proceed with connecting the conductor wires of the incoming cable in one arrangement, the terminal block must be separate from the housing with the incoming cable wires and some back plane wiring bridging the gap between the block and the housing and increasing the difficulty in the operation. After completion of the wiring connections, the block is then mounted onto the housing. The accompanying movement and flexing of all the wires into convenient positions adds to assembly problems and may place a strain both upon the wires and upon their terminations. Alternatively, in another arrangement, difficulty results because the incoming cable is away from its final stowed position within the housing so as to allow access to the terminal block on the incoming side for connection purposes. Subsequent movement of the incoming cable into the stowed position again requires flexing of the wires, thus placing the wires and their terminations in tension.

The present invention provides a building entrance terminal which seeks to overcome the above problems.

According to the invention, a building entrance terminal housing contains a first terminal block in an incoming field, a second terminal block in an outgoing field, and a mounting block for overvoltage protection units in a protection field. The terminal blocks are secured to the housing by mounting means. The fields lie side-by-side in a front view upon the terminal. The terminal blocks and the mounting block are wired together in a back plane within the housing behind the mounting means and mounting block. The housing defines a stowage space for incoming cable, the stowage space and first terminal block also lying side-by-side in a front view upon the terminal.

Thus in the terminal according to the invention, the stowage space, first terminal block, mounting block and second terminal block lie side-by-side in a front view of the terminal. Because of the relationship of the stowage space with the first terminal block, it is possible for the incoming cable to be laid into the stowage space and secured in position before the conductor wires of the cable are connected into the first terminal block. In addition, the first terminal block is also in its final position upon the housing before connection of the incoming conductor wires takes place. Thus no movement of the cable or the first terminal block is necessary after the incoming cable has been connected to the block. It follows that with both the cable and terminal block securely held in position before the connection process, the difficulties with the connection process are minimized and no undue tensions are placed upon the conductor wiring such as would be caused by movement of either terminal block or cable after the connection process.

Preferably, the first terminal block is recessed within the housing and has walls of the housing extending from its mounting means. The walls define the recess and separate the first terminal block from the other fields. A movable cover is locatable over the recess so as to completely shroud the first terminal in use. Further, in the preferred arrangement, the recess opens along one side into the stowage space and the cover extends over both the stowage and the recess.

BRIEF DESCRIPTION OF THE DRAWINGS

One embodiment of the invention will now be described, with reference to the accompanying drawings, in which:

FIG. 1 is an isometric front view of a building entrance terminal with doors of the terminal open so as to show detail within the terminal;

FIG. 2 is a cross-sectional view through the terminal taken along line II—II in FIG. 1 and with one door closed;

DESCRIPTION OF THE PREFERRED EMBODIMENT

Figure 3:
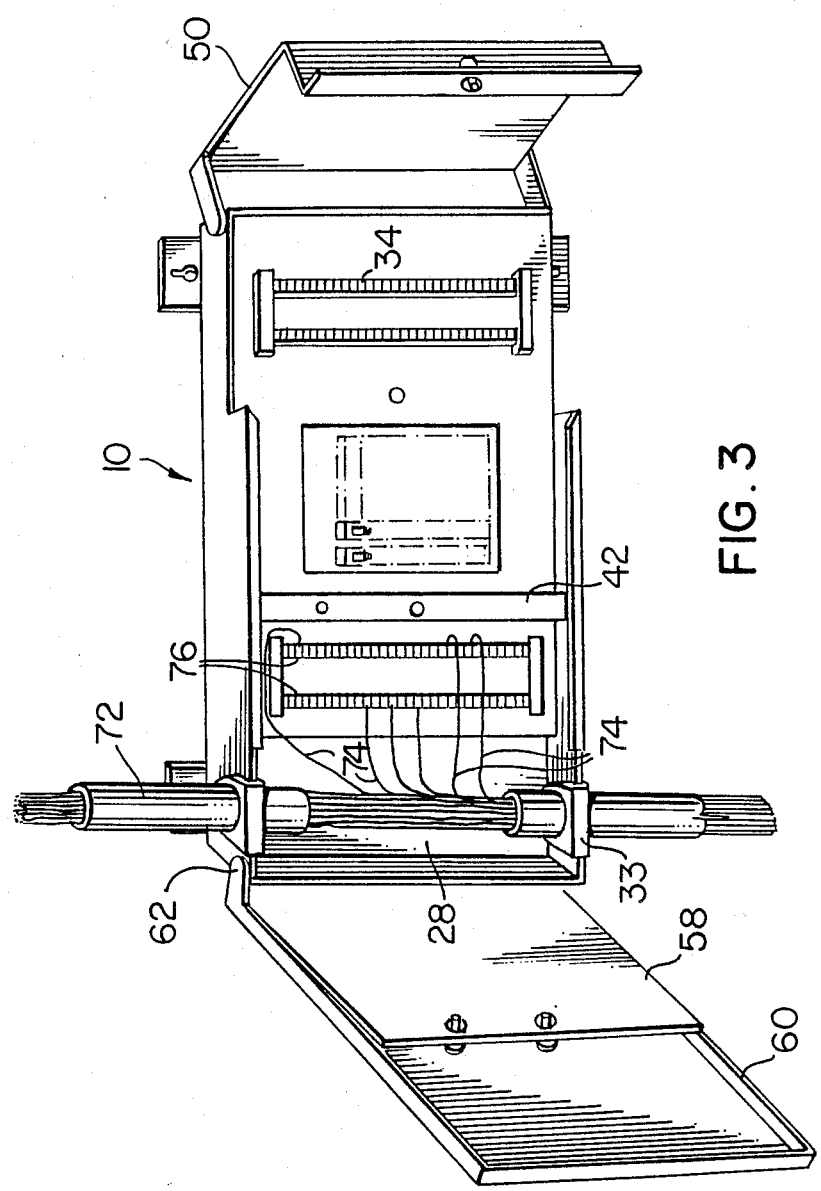
FIG. 3 is a view similar to FIG. 1 and showing an incoming cable located in position within the terminal and connected to a terminal block of the terminal.

As shown particularly by FIGS. 1 and 2, a building entrance terminal 10 of the embodiment comprises a housing 12 with back wall 14, two side walls 16 and 18 and upper and lower walls 20 and 22. As can be seen from the figures, the upper and lower walls 20 and 22 have a decreased width at the right-hand side in the figures, i.e. at an outgoing field side, and this also reduces the width of the side 18. A metal partition 24 lies parallel to the back wall 14 and is spaced from the back wall by the width of the reduced ends of the upper and lower walls 20 and 22 so as to form a three-sided structure at the outgoing field side with the walls 20, 22 and 18. This partition extends across the housing and between the full width parts of the walls 20 and 22 to which it is also secured. The partition 24 terminates a distance away from the side wall 16. Between the end 26 of the partition 24 and side wall 16 is provided a stowage space 28 for incoming cable. This stowage space is defined between the upper and lower walls 20, 22, side wall 16 and an end wall 30 of the partition 24, the end wall extending from the end 26 of the partition to the back wall 14. The upper and lower walls 20 and 22 are formed with slots 31 which have elastomeric seals 33 fitted therein for sealing around an incoming cable passed through the seals at either end.

The partition 24 serves as a mounting means for a first terminal block 32, second terminal block 34 and a mounting block 36 for removable overvoltage protection units 38. The terminal blocks, mounting block and overvoltage protection units are all of conventional construction. The terminal block 32 is mounted upon the partition 24 adjacent to the end 26 and is located in an incoming field which is adjacent to the stowage space 28 while lying at the side of the stowage space in the front view of the terminal, as shown particularly in FIGS. 1 and 3. In fact, the terminal block 32, mounting block 36 and terminal block 34 also lie side-by-side in the front view. The terminal block 34 is, of course, located in the outgoing field.

As can be seen from the figures, the partition 24, in being disposed between front and back edges of the upper and lower sides 20 and 22, provides a base for a recess 40 for the terminal block 32. This recess has walls defined by the upper and lower sides 20 and 22 and also by a separating partition 42 which extends towards the front of the terminal from the partition 24 and separates the terminal block 32 from the protection field accommodating the overvoltage protection units 38. The recess 40 opens into the stowage space 28 completely along one side of the recess, i.e. between the upper and lower sides 20 and 22 at the end 26 of the partition 24. In the protection field, the mounting block 36 is provided with a peripheral flange 44, the free end of which is rivetted to the partition 24 so that the mounting block 36 extends behind the partition towards the back wall. The partition 24 is formed with an aperture 46 within the flange 44 to enable the overvoltage protection units 38 to be mounted upon the mounting block 36 as shown.

The partition 24 and the mounting block 36 separate a back plane of the terminal from a front plane which is occupied by the terminal blocks 32 and 34 and the protection units 38. The back plane is completely closed by the partition 24, mounting block 36, top, bottom, side and end walls 18, 20, 22 and 30 and the back wall 14. Within the back plane, factory installed wiring 47 connects back plane terminals of the terminal block 32 with back plane terminals of the mounting block 36 (FIG. 2). Other back plane terminals are connected by wiring 48 with back plane terminals of the terminal block 34. In known manner, the overvoltage protection units 38 serve to electrically connect individual wires 47 with individual wires 48 through the mounting block. The mounting block 36 is also provided with ground terminals each of which is electrically connected to a ground in an individual overvoltage protection unit 38 and ground wires extend from these terminals to a suitable ground location. The ground wiring is not shown in the embodiment for purposes of clarity.

Figure 4:
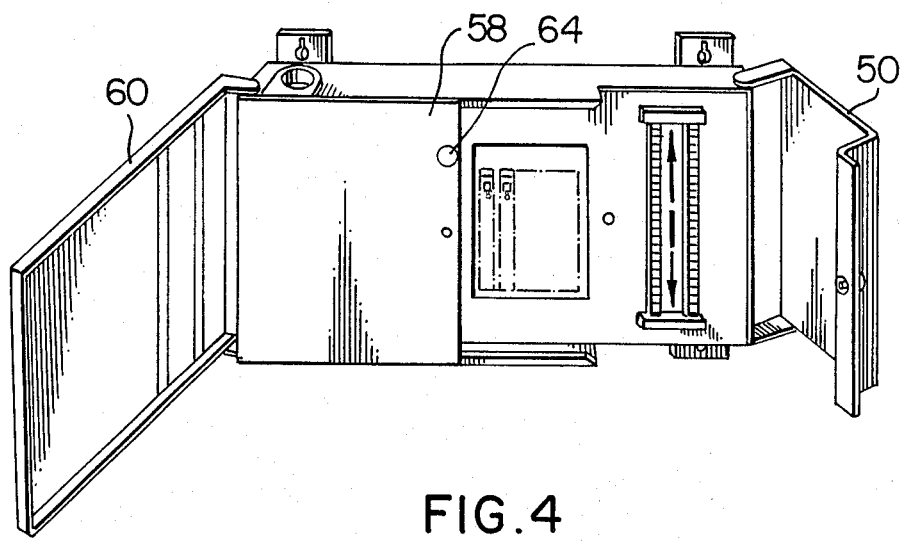
FIG. 4 is a view similar to FIG. 3 and showing the terminal partly closed.
Figure 5:
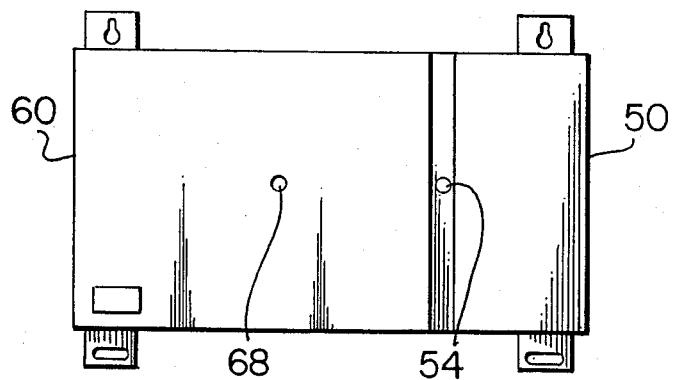
FIG. 5 is a view similar to FIG. 3 showing the terminal fully closed.

The terminal 10 is provided with several covers in the form of doors for covering the stowage space, incoming and outgoing fields, and the protection field. The outgoing field has its own individual door 50 which is pivoted at the side 18 so as to cover the terminal block 34. The door 50 has a side flange 52 to extend alongside the terminal block 34 and the flange is provided with a rotatable locking pin 54 for passage through an aperture 56 in the partition 24 so as to close the door. Two other doors 58 and 60 are hingedly mounted about the same hinge position 62 adjacent the side wall 16. The door 58 is shorter than the door 60 and lies inside it. The door 58 is designed to cover the stowage space 28 and the recess 40 and has a locking pin 64 on an edge of the door, the locking pin receivable through an aperture 66 at a flanged end of the partition 42 for holding the door closed. The other door 60 in its closed position extends completely over the door 58 and also over the overvoltage protection units 38. The door 60 is held in place with a locking pin 68 receivable through another aperture 70 in the flange of the partition 42. FIG. 4 is a view with only door 58 closed and FIG. 5 shows the terminal with all doors closed.

In use of the building entrance terminal, the terminal may be disposed as a single terminal in a building, in which case a cable will enter through either the upper or the lower wall into the stowage space 28. However, as shown in the embodiment, the terminal 10 is one of a number of terminals (the others not shown) which are mounted one above another upon a wall of a building and the incoming cable 72 (FIG. 3) is passed through the lower seal 33, up through the stowage space 28 and out through the upper seal 33 so as to pass to the next adjacent terminal 10. The part of the cable to be disposed within the stowage space 28 has its jacket and sheath removed so that the conductor wires 74 of the core are exposed for connection purposes as shown in FIG. 3. Some of these conductor wires are selected for connection into insulation displacement terminals 76 in the front plane of the terminal block 32. To connect these wires to the terminal block, the cable is first secured into the stowage space as shown in FIG. 3, and with the terminal block 32 also in its position of use upon the partition 24, the selected conductor wires 74 are passed out of the cable core to make the connection. This connection arrangement is conventional and need not be described in the specification.

As can be seen from the above description, the difficulties in connecting the incoming cable into the front plane side of the incoming terminal block 32 are minimized. In this particular arrangement and according to the invention, the cable is previously secured in its final position and with the terminal block also in its final position, neither the cable nor the terminal block needs to be controlled manually during the connection operation. In addition, because the cable and the terminal block 32 lie side-by-side in the front view, then they are completely accessible to the operator who easily selects his conductor wires 74, severs them at the correct position along the cable length and then draws them away from the core so as to make the connection with the terminal block. As will be realized, this is a relatively simple operation. The inventive terminal avoids having the incoming terminal block loose from the terminal during the connection process and also having the cable loosely held during connection. As a result, lengths of wire do not extend from the housing 12 to the terminal block to complicate the connection operation. Further to this, because the cable and the incoming terminal block are in their final positions prior to wire connection, no undue strain is placed upon the selected conductor wires during subsequent location of the cable or terminal block within the housing.

The embodiment described uses a certain number and arrangement. It will be understood that building entrance terminals of the invention may have a different number and arrangement of doors. For instance, in one modification (not shown) of the embodiment, the three doors are replaced by two doors. A first of these doors is similar to door 58 of the embodiment and only covers the stowage space and recess 40 (i.e. the incoming field). The second door hinges at the other side of the housing and in a closed position extends across the terminal block 34 and mounting block 36. The free edge of the second door is secured in a position overlapping the free edge of the first door which is itself separately secured to the housing. This overlapping arrangement ensures that the first door cannot be unfastened and opened to expose the stowage space before the second door is unfastened and opened.

In another modification having a similar overlapping arrangement between two doors as in the above modification, the first door extends solely over the stowage space while the second door extends completely across the three fields, i.e. across terminal block 34, mounting block 36 and terminal block 32.

I claim:

1. A building entrance terminal comprising:
   (a) a housing having a back wall, side walls, and upper and lower walls defining a housing interior accessible from a front of the housing,
   (b) a terminal block in an incoming field,
   (c) a mounting block in a protection field said mounting block carrying a plurality of overvoltage protection units,
   (d) the terminal block and the mounting block being wired together in a back plane within the housing behind the terminal block and mounting block, and
   (e) the housing also defining an integrally formed stowage space for incoming cable, the stowage space, terminal block and mounting block disposed side-by-side in a transverse direction across the housing from one said side wall to another for unrestricted and direct access of the terminal block, mounting block and stowage space from the front of the housing.

2. A terminal according to claim 1 comprising a planar housing partition located between the rear wall and the front of the housing, confronting and spaced from the rear wall to define the back plane between the rear wall and the partition and also defining a recess in a front side, the partition carrying the terminal block and the mounting block, and the partition having one end spaced from one said side wall of the housing to define the stowage space for incoming cable between the end of the partition and recess and said side wall with the stowage space also extending from the rear wall, through the plane of the partition to the front of the housing.

3. A terminal according to claim 1 wherein the terminal block is a first terminal block and lies within a recess in the housing and wherein one said upper and lower walls and of the side walls of the housing and a separating partition extending from a mounting means define the recess and separate the first terminal block from the protection field, and a movable cover is locatable over the recess.

4. A terminal according to claim 3 wherein the recess opens along one side into the stowage space and said movable cover is locatable so as to cover the stowage space and the recess.

5. A terminal according to claim 4 wherein the protection field lies next to the incoming field and the mounting block also lies within a recess of the housing, said mounting block recess defined by one of said side walls, said back wall, said mounting means, and said upper and lower walls of the housing, and a further cover is provided covering the overvoltage protection units.

6. A terminal according to claim 5 further comprising a second terminal block and wherein the mounting means for the first and second terminal blocks is provided by a single housing partition which extends through the housing and also holds the mounting block and said first and second terminal blocks within the housing.

* * * * *